Figure 1:
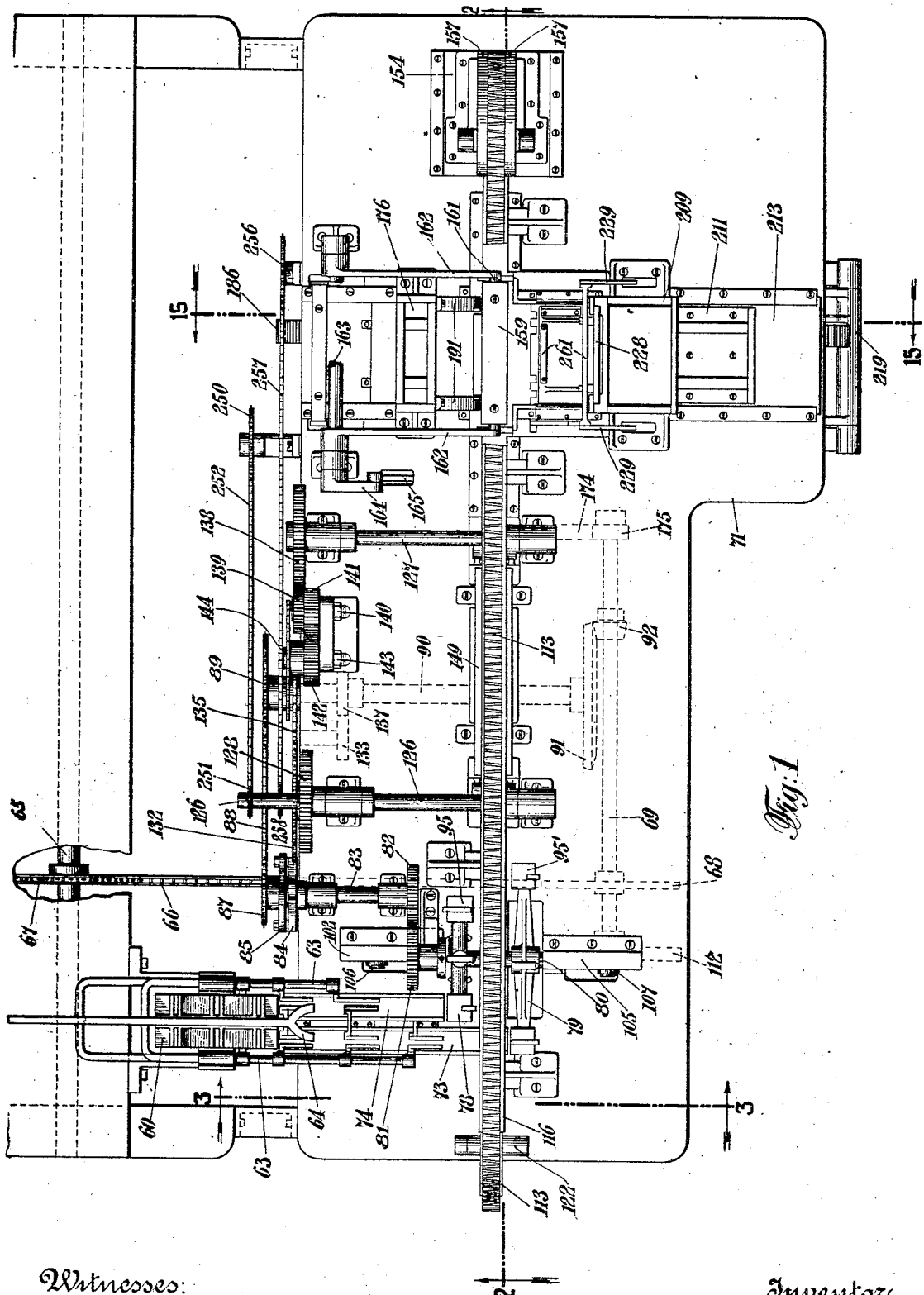

J. C. DONNELLY.
MACHINE FOR PACKING MATCH BOOKS, &c.
APPLICATION FILED APR. 22, 1913.

1,132,309.

Patented Mar. 16, 1915.
14 SHEETS—SHEET 2.

Fig. 2

Witnesses:
M. B. Grevey
F. R. Griffin

Inventor
Joseph C. Donnelly
By his Attorney John F. Nolan

J. C. DONNELLY.
MACHINE FOR PACKING MATCH BOOKS, &c.
APPLICATION FILED APR. 22, 1913.
1,132,309.
Patented Mar. 16, 1915.
14 SHEETS—SHEET 3.
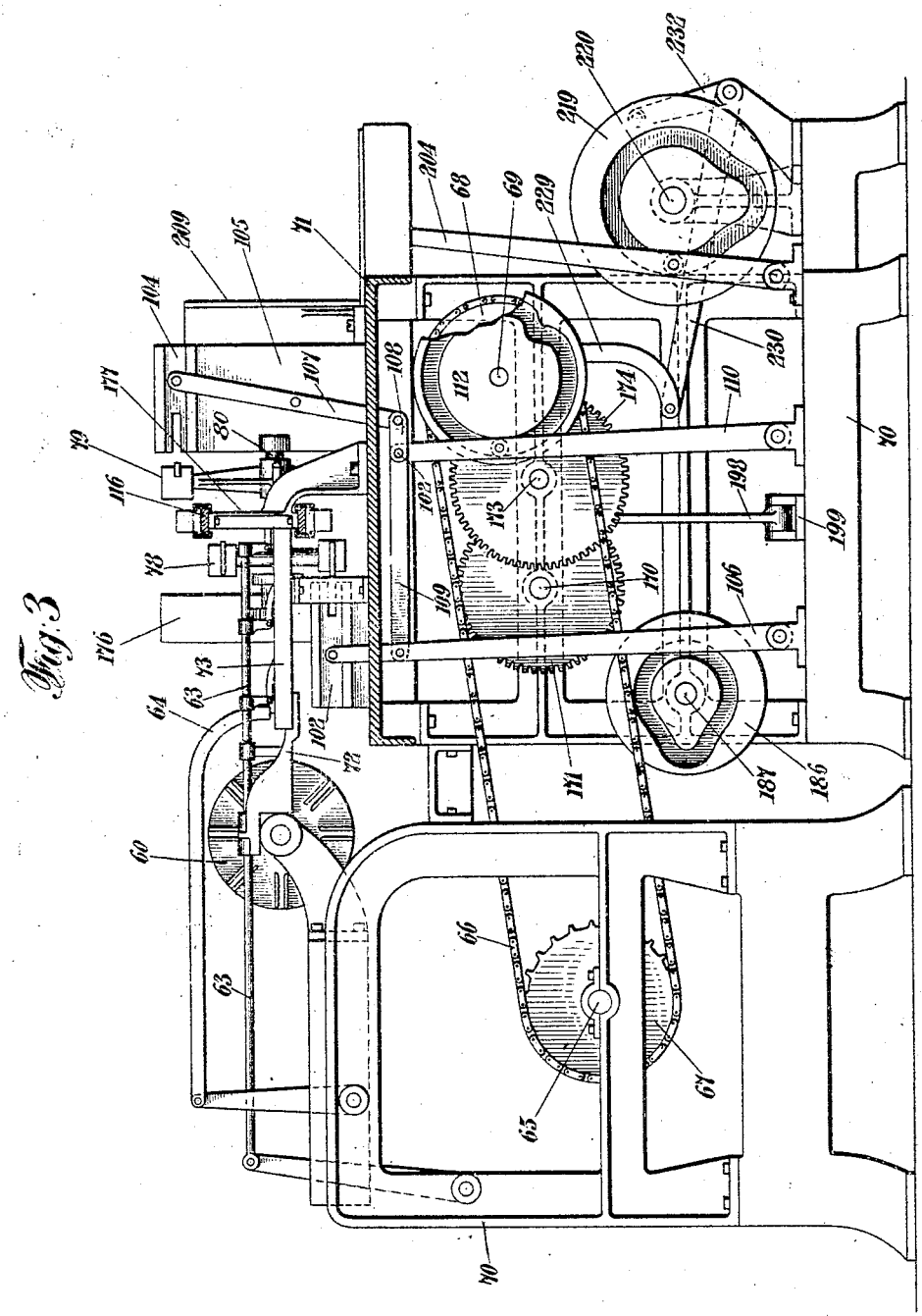
Witnesses:
M. B. Goeney
F. R. Griffin
Inventor
Joseph C. Donnelly
By his Attorney John F. Nolan J. C. DONNELLY.
MACHINE FOR PACKING MATCH BOOKS, &c.
APPLICATION FILED APR. 22, 1913.
1,132,309.
Patented Mar. 16, 1915.
14 SHEETS—SHEET 4.
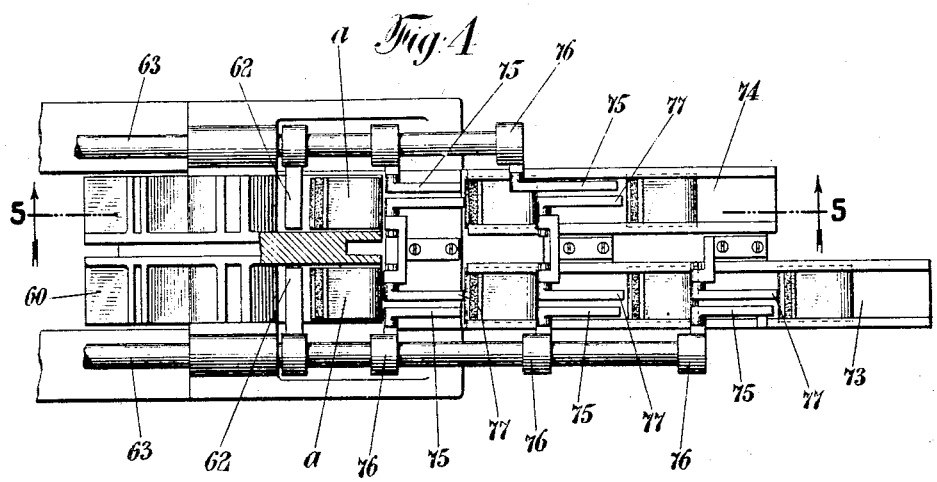
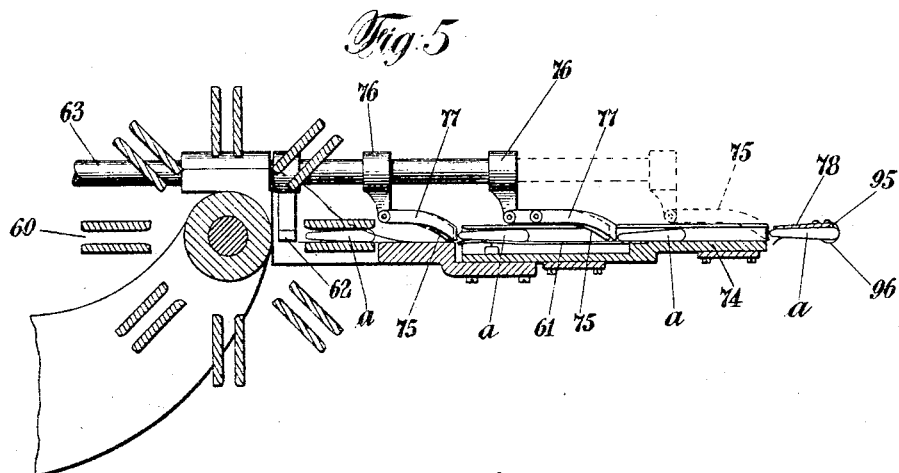
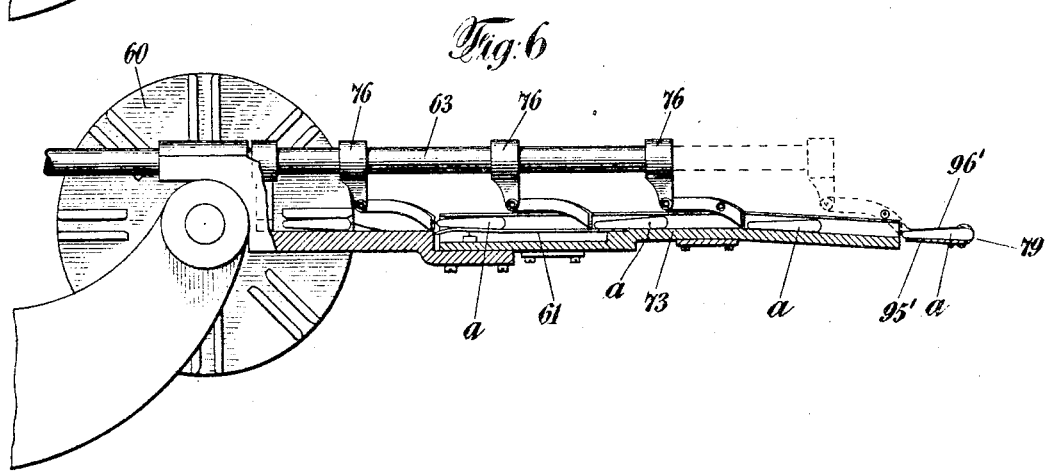
Witnesses:
Inventor
Joseph C. Donnelly
By his Attorney

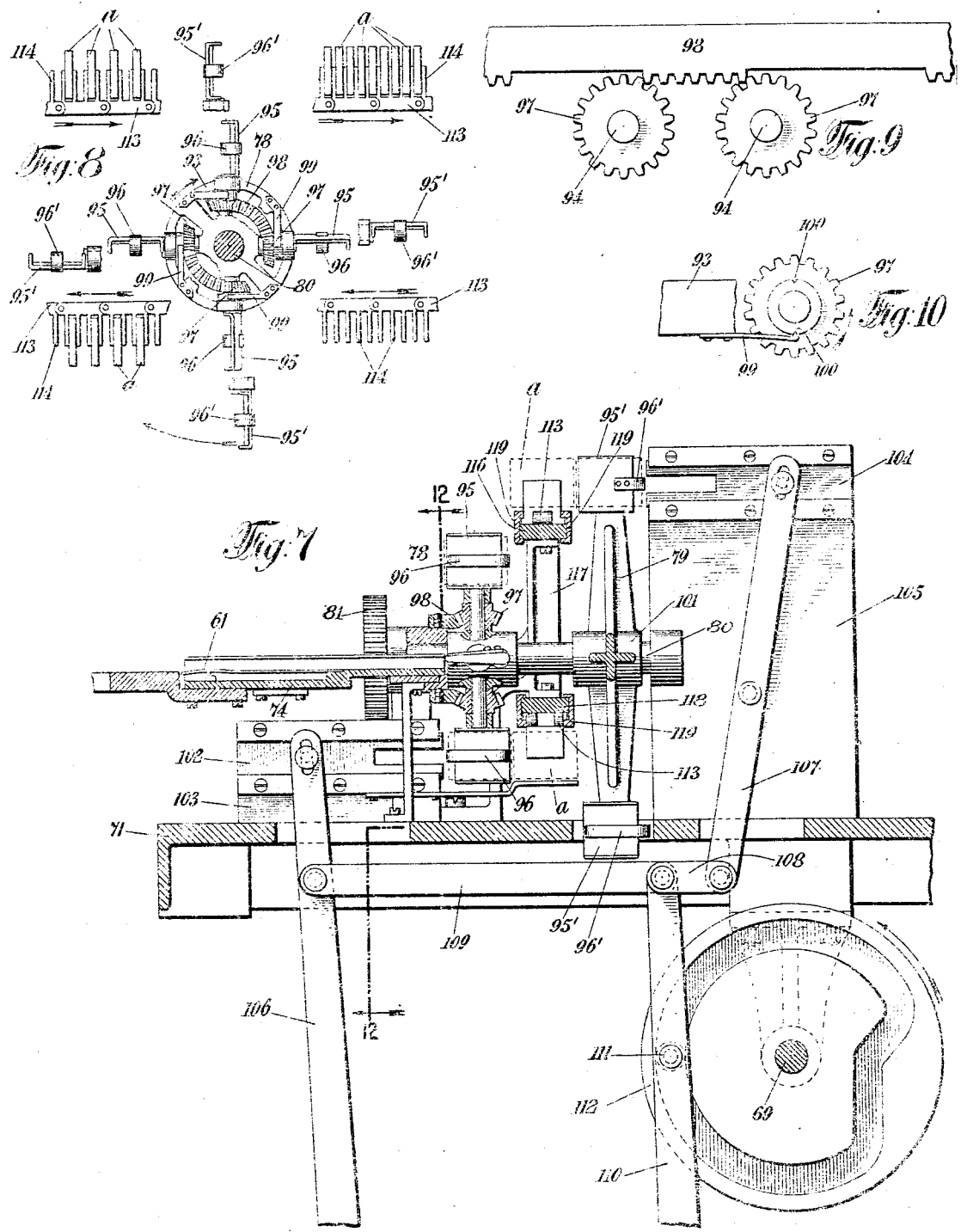

J. C. DONNELLY.
MACHINE FOR PACKING MATCH BOOKS, &c.
APPLICATION FILED APR. 22, 1913.
1,132,309.
Patented Mar. 16, 1915.
14 SHEETS—SHEET 6.
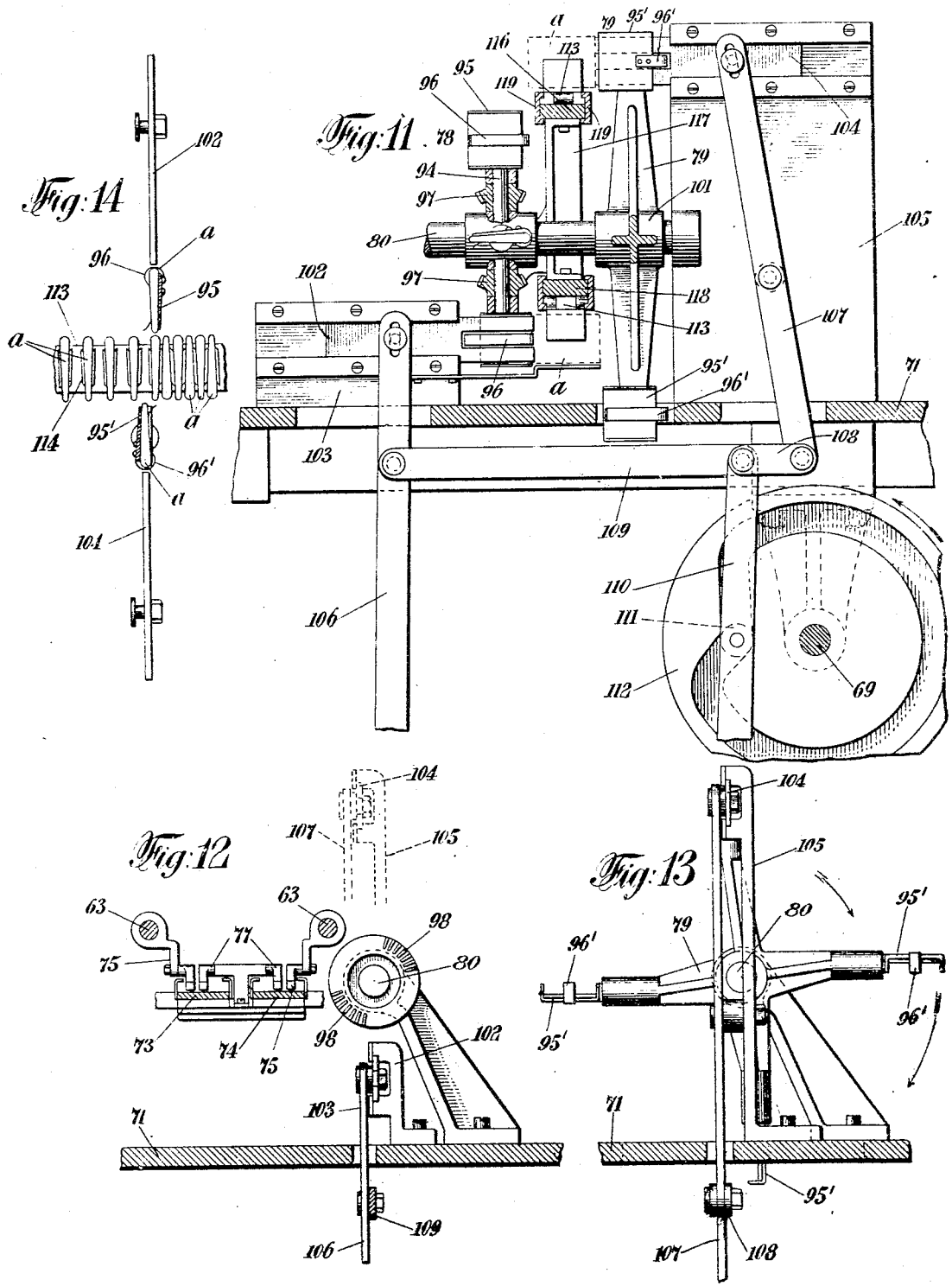
Witnesses:
Inventor
Joseph C. Donnelly
By his Attorney

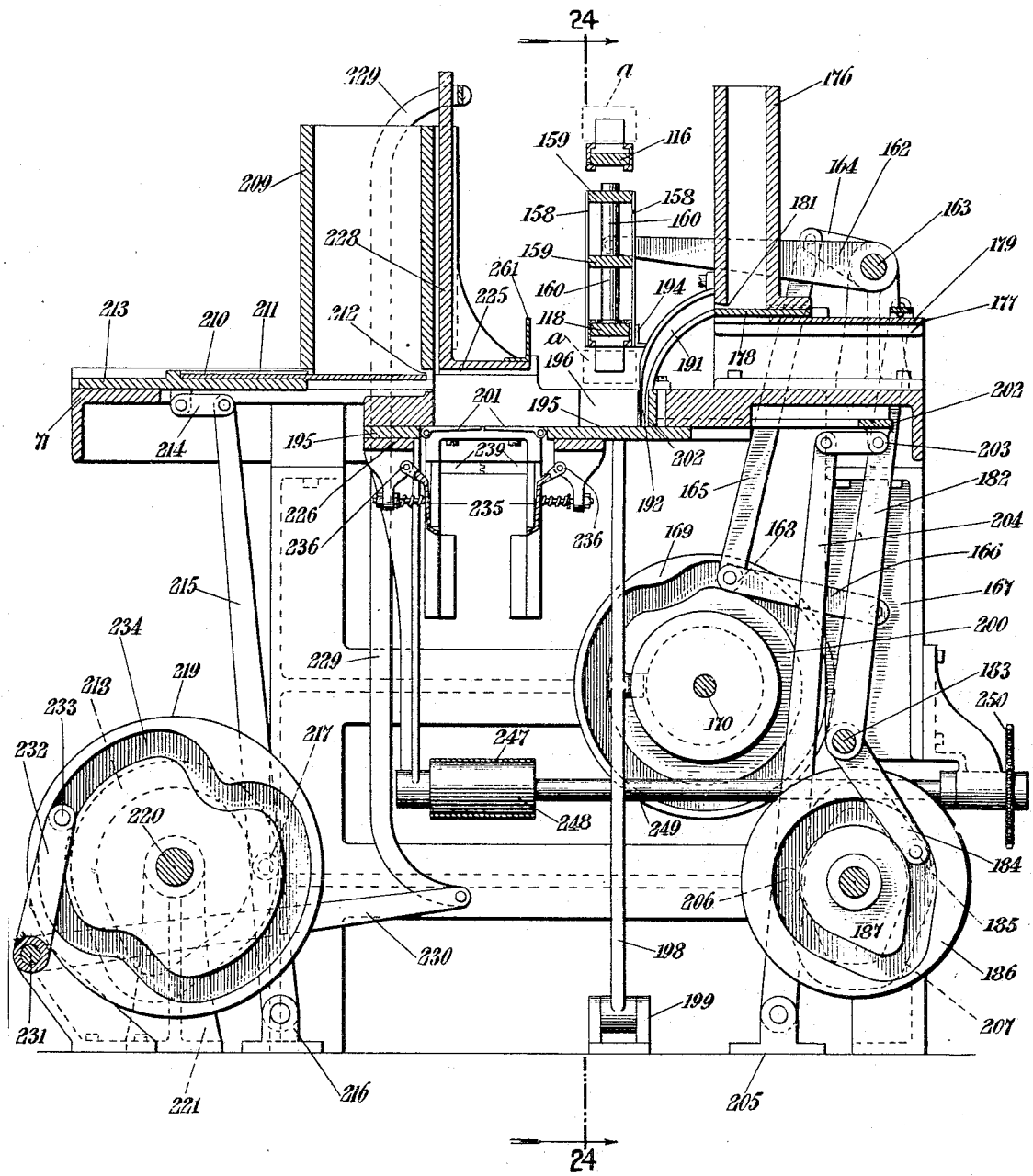

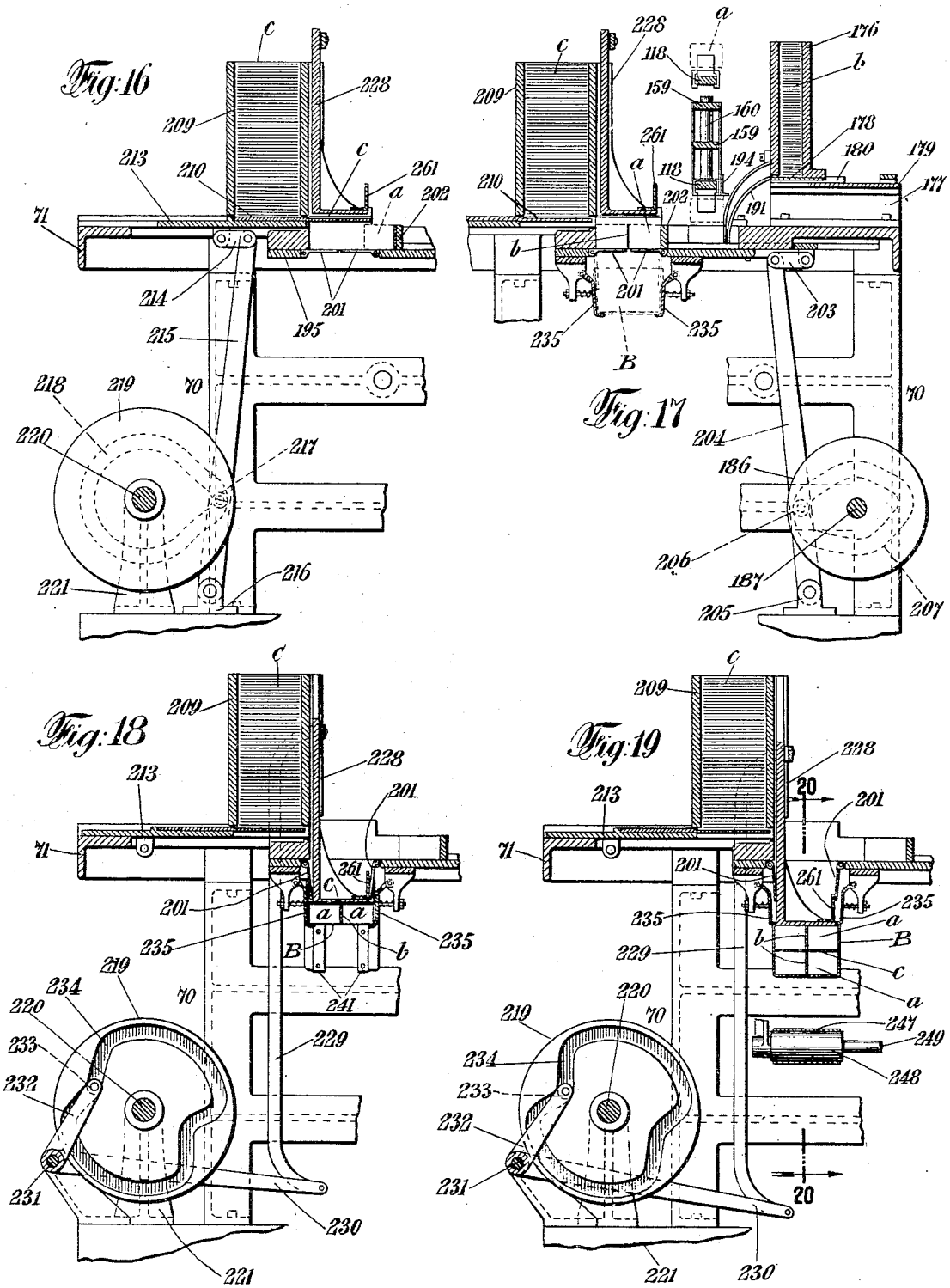

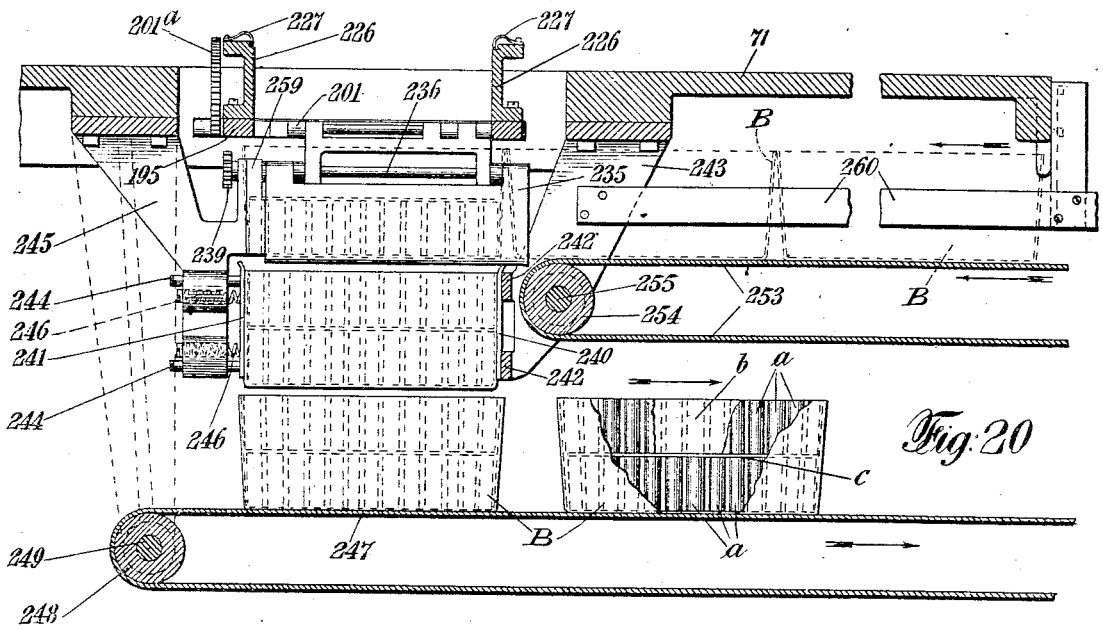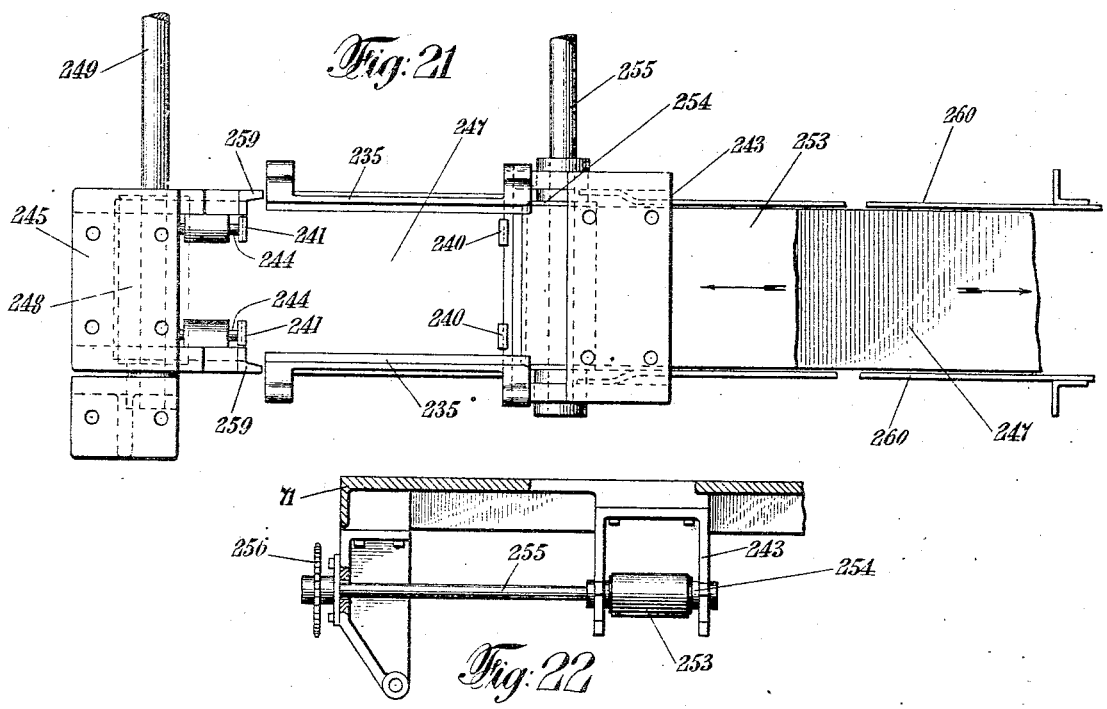

J. C. DONNELLY.
MACHINE FOR PACKING MATCH BOOKS, &c.
APPLICATION FILED APR. 22, 1913.
1,132,309.
Patented Mar. 16, 1915.
14 SHEETS—SHEET 10.
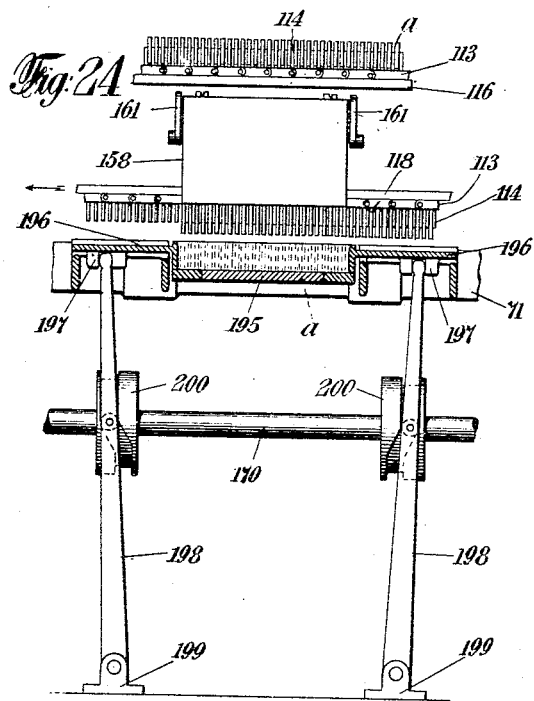
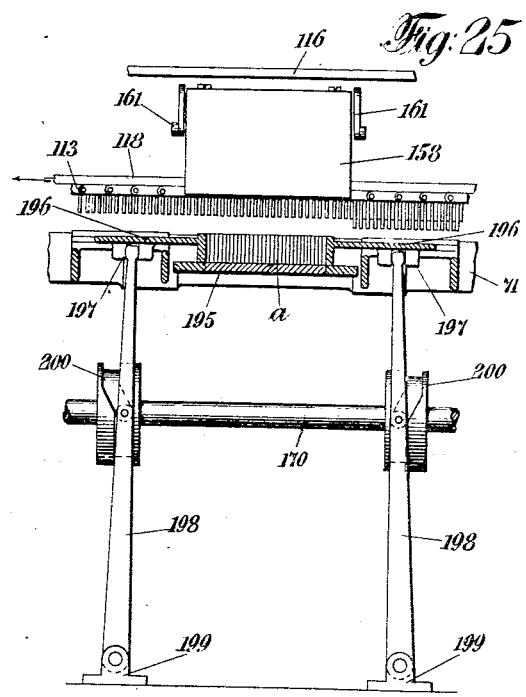
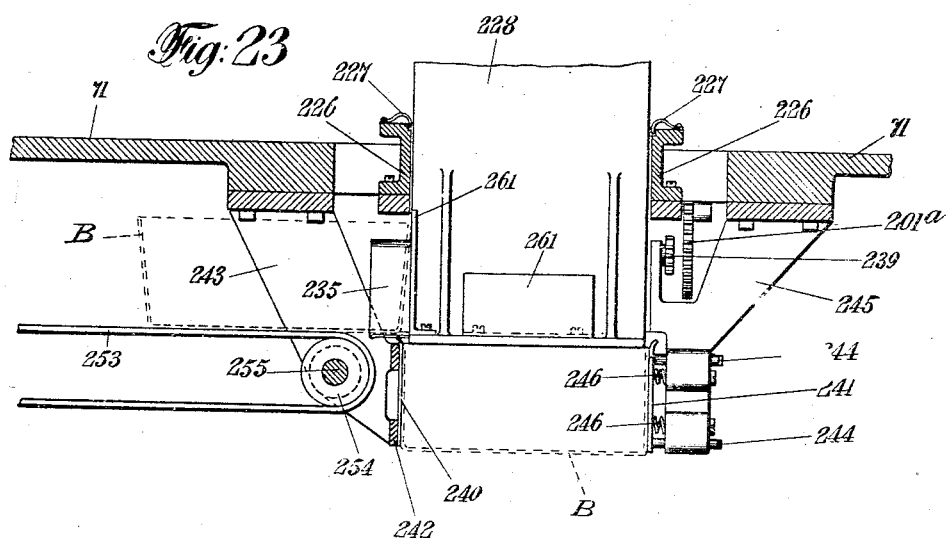
Witnesses:
Inventor
Joseph C. Donnelly
By his Attorney John R. Nolan

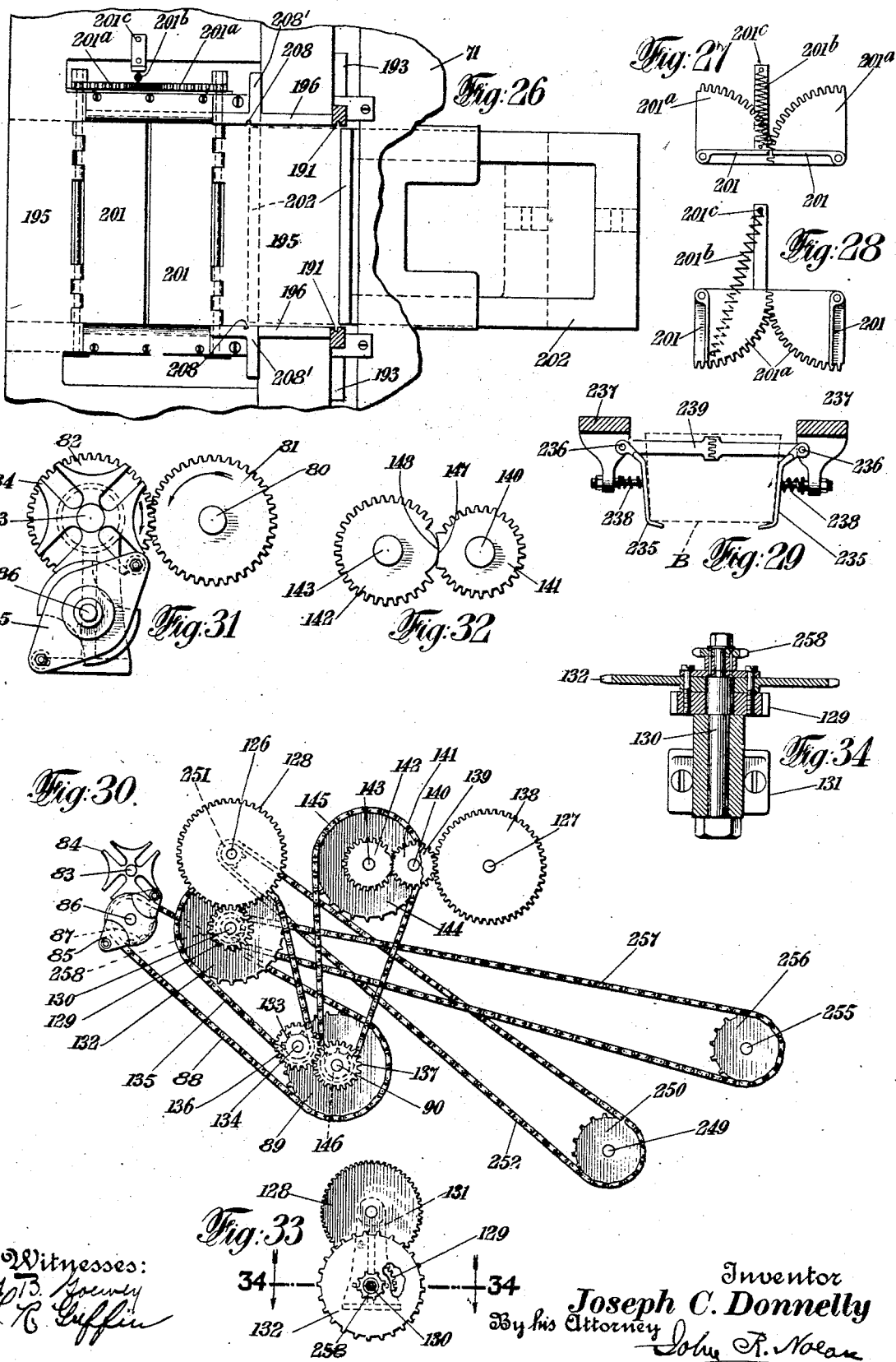
J. C. DONNELLY.
MACHINE FOR PACKING MATCH BOOKS, &c.
APPLICATION FILED APR. 22, 1913.
1,132,309.
Patented Mar. 16, 1915.
14 SHEETS—SHEET 11.
Inventor
Joseph C. Donnelly
By his Attorney
John R. Nolan
Witnesses:

J. C. DONNELLY.
MACHINE FOR PACKING MATCH BOOKS, &c.
APPLICATION FILED APR. 22, 1913.
1,132,309.
Patented Mar. 16, 1915.
14 SHEETS—SHEET 12.
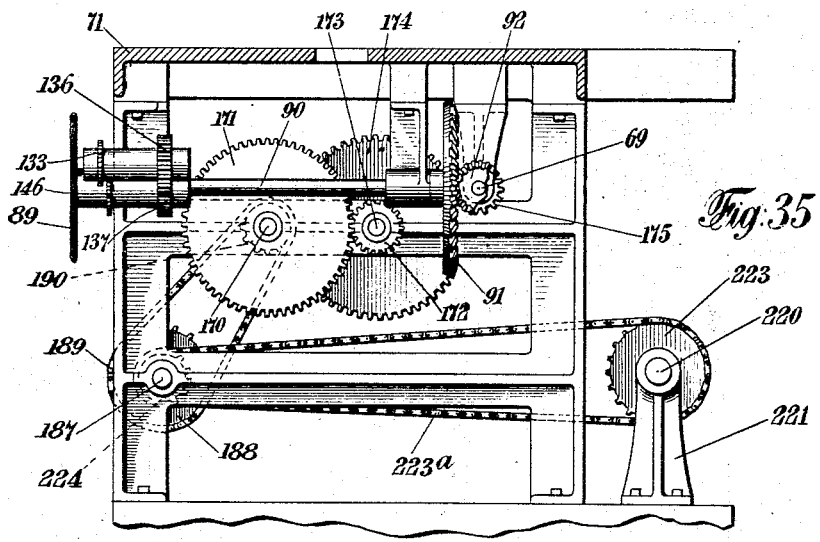
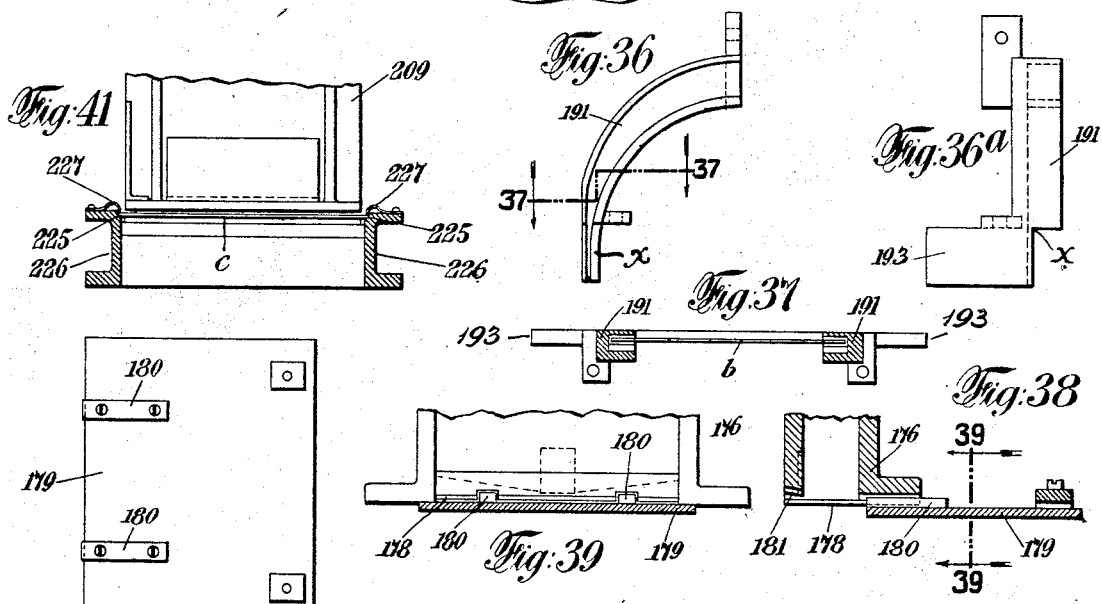
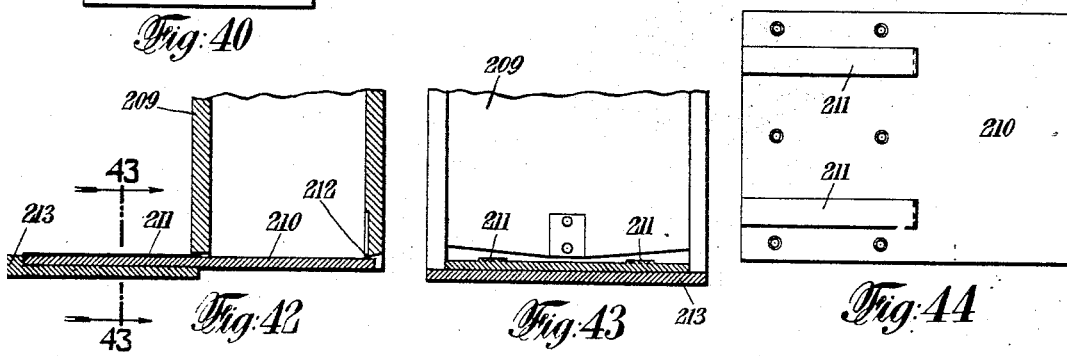
Witnesses:
Inventor
Joseph C. Donnelly
By his Attorney

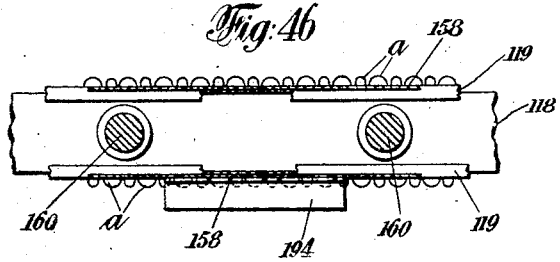
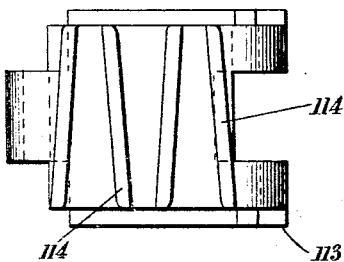
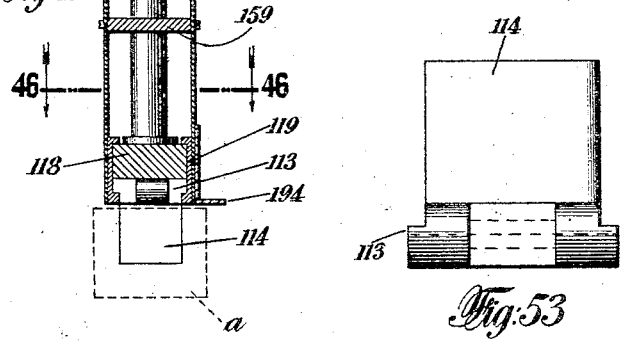
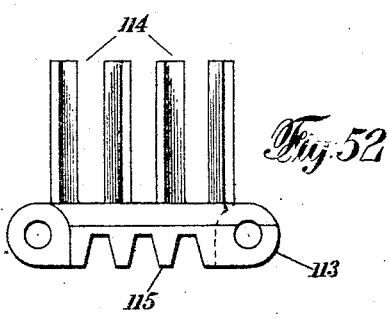
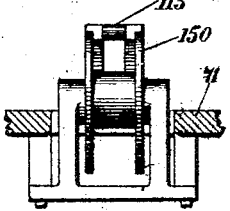
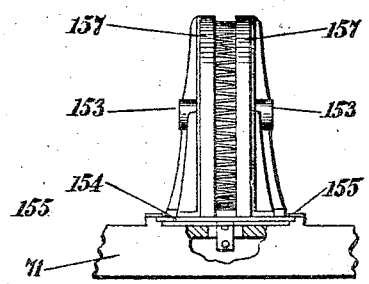
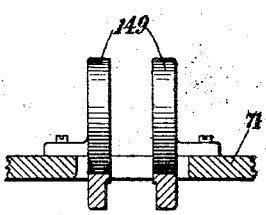

J. C. DONNELLY.
MACHINE FOR PACKING MATCH BOOKS, &c.
APPLICATION FILED APR. 22, 1913.
1,132,309.
Patented Mar. 16, 1915.
14 SHEETS—SHEET 14.
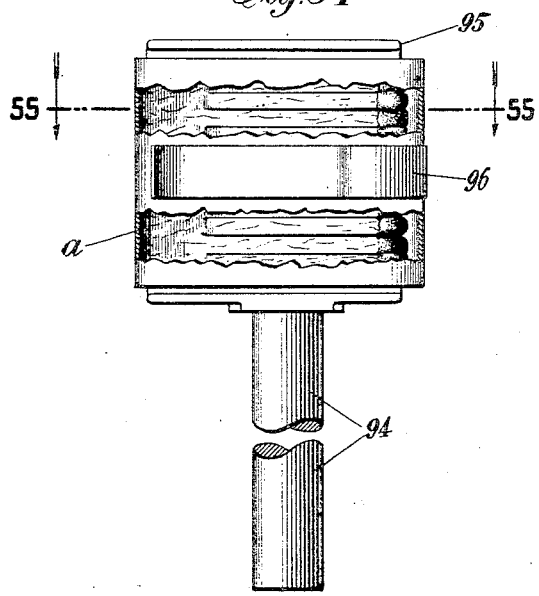
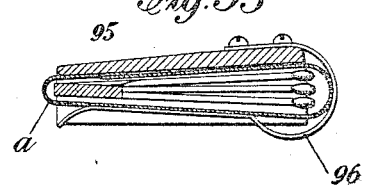
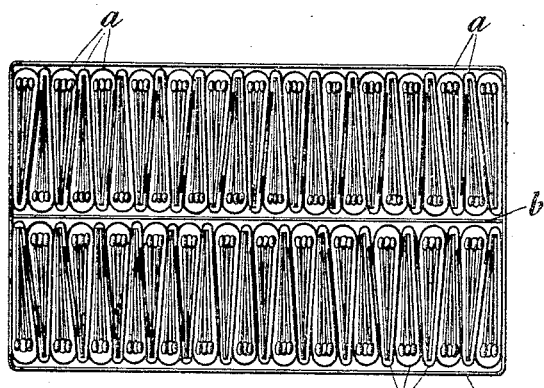
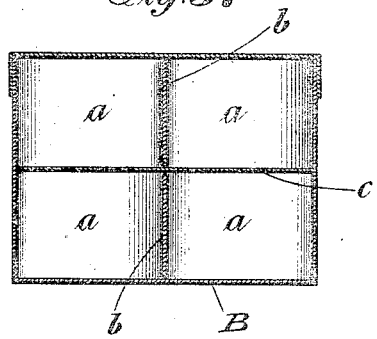
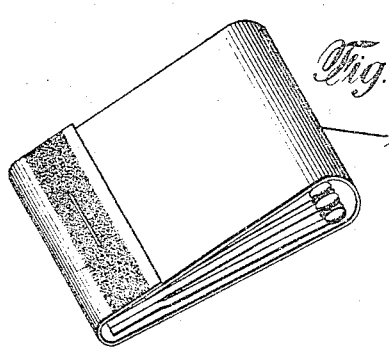
Witnesses:
Inventor
Joseph C. Donnelly
By his Attorney
John R. Nolan

UNITED STATES PATENT OFFICE.

JOSEPH C. DONNELLY, OF BARBERTON, OHIO, ASSIGNOR TO THE DIAMOND MATCH COMPANY, OF CHICAGO, ILLINOIS, A CORPORATION OF ILLINOIS.

MACHINE FOR PACKING MATCH-BOOKS, &c.

1,132,309.     Specification of Letters Patent.     Patented Mar. 16, 1915.

Application filed April 22, 1913. Serial No. 762,872.

*To all whom it may concern:*

Be it known that I, JOSEPH C. DONNELLY, a citizen of the United States, and resident of Barberton, in the county of Summit and State of Ohio, have invented certain new and useful Improvements in Machines for Packing Match-Books, &c., of which the following is a specification.

This invention relates to a machine for packing book or card matches and the like; the same being especially, though not exclusively, designed for use in connection with the match-book making machine set out in Letters Patent of the United States No. 1,042,472, dated October 29, 1912, to which reference may be had.

The primary object of my invention is to provide a machine whereby book or card matches, and similar articles, are rapidly packed, uniformly and compactly, in predetermined quantities in suitable boxes or containers.

Another object is to provide for the packing of the articles in rows, groups or layers with partition or separating members between adjacent rows, groups or layers.

Other objects of my invention will hereinafter appear.

My invention, as generally stated, comprehends in a packing machine, means whereby book or card matches and the like are assembled side by side, preferably with the match heads of adjacent books or cards oppositely-disposed; means whereby predetermined numbers of the articles thus assembled are removed from the assemblage; means whereby the articles thus removed are disposed in successive rows for packing; means whereby the rows of articles are compressed to occupy a prescribed space; means whereby narrow partition strips are supplied to and interposed between successive rows of the articles; means whereby a series of partitioned rows of articles are disposed one upon the other with a separating or partitioning strip between them, and means whereby the separated and partitioned rows of articles are introduced to a suitable box or container.

My invention also comprises various features of construction and organization, and principles of operation, which will be hereinafter described and claimed.

In the patented machine above-referred to, match books, wedge-like or tapering in form, (owing to the presence of the match heads of the covered cards or splints,) are produced, and discharged in succeeding pairs therefrom with their larger ends rearward; and accordingly, the machine herein illustrated as embodying an efficient form of my invention, is designed to receive the books as rapidly as they are thus discharged and pack them in predetermined quantities, uniformly and compactly, in suitable boxes or containers, in such manner that each box will contain two layers of match-books with a wide partition strip between them, and each layer will comprise two orderly rows of matches with a narrow partition strip between them.

It is to be here noted that my invention is not limited to use with any specific match-book machine, whether single or double discharge; nor, indeed, with a book-making machine at all, for the reason that the books may be delivered from any suitable source of supply. It is also to be noted that my invention is not limited to a machine for the packing of match-books, that is, card matches with covers,—either tapering or parallel—but that the machine may be employed to assemble and pack card-matches devoid of covers, or, in other words, the invention comprehends a machine for the packing of unitary group matches, whether covered or uncovered. It is further to be noted that my invention is not limited to the particular illustrative form or forms of mechanisms herein shown and described, as the same may be variously modified without departure from the fair spirit of the invention.

In the drawings—Figure 1 is a plan of a packing machine embodying a form of my invention adapted to the packing of tapering match-books, a portion of the match-book making machine being shown. Fig. 2 is a longitudinal vertical section, as on the line 2—2 of Fig. 1. Fig. 3 is a partial transverse vertical section, as on the line 3—3 of Fig. 1, showing a portion of the match-book making machine in end elevation. Fig. 4 is a plan of the trackways into which the match-books are delivered in successive pairs by the book-making machine, showing among other things, the feed and stop dogs for the books. Fig. 5 is a longitudinal vertical section, as on the line 5—5 of Fig. 4, showing, adjacent the short track-way, one of the turret pockets of the book-positioning mechanism. Fig. 6 is a side elevation, partly in longitudinal section, of Fig. 4, showing, adjacent the long trackway, one of the turret pockets of said positioning mechanism. Fig. 7 is a partial sectional elevation on a plane through the short trackway, showing the pocketed turrets, and the mechanism for shifting the books from said turrets to the endless carrier. Fig. 8 is a detail, in elevation, of the forward or small turret, showing the gearing for independently turning the book-holding pockets thereof. In this view the pockets of the adjacent or large turret are indicated and also adjacent fragments of the upper and lower stretches of the endless book-carrier. Fig. 9 is a development, on a larger scale, of a portion of the segmental gear rack and also two of the pinions which co-act therewith for turning the book-holding pockets of the small turret. Fig. 10 is a detail of one of the pinions and a locking dog engaged with the notched hub of the pinion. Fig. 11 is a sectional elevation similar to Fig. 7, with the trackway and other parts omitted and the book-shifting mechanism indicated in position as inserting the books into the carrier. Fig. 12 is a transverse section through the trackways, and their adjuncts, as on the line 12—12 of Fig. 7; the relation of the upper to the lower book-shifting slide being indicated by dotted lines. Fig. 13 is a detail, in elevation, of the large turret and adjuncts. Fig. 14 is a diagram, in sectional plan, showing the relative positions of the book carrier, the adjacent turret pockets and the ejecting slides. Fig. 15 is a transverse vertical section of the machine, on a plane through the book-ejecting, partitioning and boxing mechanisms, as on the line 15—15 of Fig. 1. Fig. 16 is a sectional detail through the wide strip-supplying hopper, and adjuncts, showing the strip-feeding slide as inserting a strip into the spring supports and in position for engagement and depression by the "boxing" plunger. In this view the cam and connections for actuating the said slide are shown. Fig. 17 is a similar view through both hoppers, including the book-ejector, the box-holder, and adjuncts; the parts being shown in the position which they occupy upon the second action of the "positioning" plunger; two rows of books, with a partition strip between them, and a wide strip placed upon them, being represented in the path of the "boxing" plunger preparatory to insertion into the box (which is indicated in dotted lines). In this view the cam and connections for actuating the positioning plunger are shown. Fig. 18 is a similar view through the wide-strip supplying hopper; showing the parts in the position which they occupy upon the first action of the "boxing" plunger. In this view the two rows of partitioned and covered match books are represented as inserted into the box by the said plunger, and the cam and connections for actuating such plunger are shown. Fig. 19 is a similar view, showing the parts in the position which they occupy upon the second action of the "boxing" plunger. In this view the box is represented as filled and expressed from the holder by the action of said plunger. Fig. 20 is a transverse vertical section, on an enlarged scale, through the discharge throat, as on the line 20—20 of Fig. 19, the "boxing" plunger being omitted and the respective conveyers for supplying the empty boxes to and removing the filled boxes from the machine, being shown. Fig. 21 is a partial plan of the mechanism shown in Fig. 20, with the table plate removed. Fig. 22 is a sectional detail, showing the feed conveyer for the empty boxes and its supporting and driving parts. Fig. 23 is a partial transverse section through the discharge throat of the machine, looking in the direction opposite to Fig. 20. In this view the lower portion of the "boxing" plunger is shown. Fig. 24 is a partial transverse vertical section, as on the line 24—24 of Fig. 15, showing the compressing slides in open position preparatory to the ejection of a row of match-books from the carrier. Fig. 25 is a similar view, showing a row of books as ejected between the slides and compressed thereby. Fig. 26 is a detail, in plan, of the swinging book-supporting plates, and adjuncts, at the discharge throat of the machine, including the notched strip-supporting members and the "positioning" plunger. Fig. 27 is a detail, in end view, of the said plates as in closed position, showing their gear and spring connections. Fig. 28 is a similar detail, showing the plates as in open position. Fig. 29 is a detail, in end view, of the swinging jaw-plates of the box holder, showing the gear connection between them. Fig. 30 is a diagram illustrating the transmission gearing for the various shafts. Fig. 31 is an elevation of a form of Geneva stop-motion for intermittently rotating the pocketed turrets. Fig. 32 is a detail, of another form of Geneva motion for periodically advancing and stopping the book-carrier at the ejecting station. Fig. 33 is a detail, in elevation, of gearing for continuously moving the carrier. Fig. 34 is a section, enlarged, as on the line 34—34 of Fig. 33. Fig. 35 is a partial transverse section through the main frame showing a part of the gearing. Fig. 36 is an enlarged view of one of the channel members of the strip-turning guide-way. Fig. 36ª is a front view of the channel member. Fig. 37 is a transverse section as on the line 37—37 of Fig. 36, showing a narrow partitioning strip as held in a vertical position by said guide-way. Fig. 38 is a sectional detail of the narrow strip supplying hopper, showing its reciprocating feed-slide. Fig. 39 is a transverse vertical section, as on the line 39—39 of Fig. 38. Fig. 40 is a plan of the feed-slide removed. Fig. 41 is a sectional detail of the wide-strip support, and adjuncts, a strip being indicated as in place. Fig. 42 is a sectional detail of the lower portion of the wide-strip supplying hopper, showing its reciprocating feed-slide. Fig. 43 is a transverse vertical section, as on the line 43—43 of Fig. 42. Fig. 44 is a plan of the slide, removed. Fig. 45 is a transverse vertical section, on an enlarged scale, through the book-ejecting plunger, and the adjacent portion of the book-carrier and the supporting members for the latter; a match-book being indicated in dotted outline. Fig. 46 is a horizontal section, as on the line 46—46 of Fig. 45, showing the projecting ends of the match-books as in position for engagement by the ejecting plunger. Fig. 47 is an end view, partly in section, of the tension and guard devices for the book-carrier, the carrier being indicated. Fig. 48 is a sectional elevation of the guide and roller devices for supporting the slack portion of the book-carrier between the intermittent and continuous driving gearing. Fig. 49 is a vertical section, as on the line 49—49 of Fig. 48; showing a portion of the book-carrier. Fig. 50 is a similar section, as on the line 50—50 of Fig. 48. Fig. 51 is a plan of one of the links of the book-carrier. Fig. 52 is a side elevation thereof. Fig. 53 is an end view of the same. Fig. 54 is an elevation, enlarged, of one of the independently rotary pockets of the "small" turret, showing a match-box therein with its cover partly torn off. Fig. 55 is a cross-section, as on the line 55—55 of Fig. 54. Fig. 56 is a plan of a box with the rows of match-books partitioned and packed therein, the cover being removed. Fig. 57 is a transverse section through the filled box. Fig. 58 is a perspective view of one of the match-books.

The discharging end of the book-match machine with which my packing apparatus is associated is represented in a general way in Figs. 1 and 3, wherein 60 indicates an intermittently-rotatable pocketed wheel, from which the books (a) are discharged in pairs, larger ends rearward, upon a yielding supporting plate 61 by the action of the ejecting arms 62 (Fig. 4) of a reciprocating frame 63; and 64 indicates reciprocating fingers by means of which the free ends of the cover flaps of the books are tucked under the stapled end folds of the covers. When the tucking operation has been completed and the fingers leave the finished books, the latter are pushed rearwardly, abreast, by the next succeeding pair of books, and so on.

The packing apparatus in the form herein chosen to illustrate my invention is located directly in rear of the book-match machine and is adapted to receive the finished books, pair by pair, as rapidly as they are discharged from the latter. In the present instance the packing apparatus is driven directly from the driving shaft 65 of the book-machine through a sprocket chain 66 which connects a sprocket wheel 67 on said shaft with a corresponding wheel 68 on the main shaft 69 of the packing apparatus. The main supporting frame 70 of the packing apparatus includes a table 71 above which extends rearwardly from a bracket 72 on the frame of the book machine two preferably parallel channels 73, 74 which constitute track-ways into which the books are directly delivered by the book machine. One (73) of these track-ways, which may be termed the long trackway, extends farther rearward than the other, (which may be termed the short trackway) and inclines downwardly at its rearward end, as will hereinafter appear. (See Figs. 4, 5 and 6.) In the present instance the books are impelled rearwardly along the trackways by means of two series of feed-dogs 75 which are pivoted to brackets 76 on rearward extensions of the reciprocating bars 63, the leading dog for the long trackway being disposed sufficiently beyond the corresponding dog of the short trackway that the leading books shall be concurrently moved to and ejected from the rearward ends of their respective trackways. The feed-dogs of each series are suitably spaced to engage the several books in the proximate trackway and advance them successively to position for engagement by the leading feed-dog; and, as a means to obviate any liability of displacement of the books by the feed-dogs during the reverse stroke of the latter, I preferably provide a series of stop-dogs 77 which are pivoted to brackets between the trackways in position to drop in front of the thin edges of the successive books in the respective trackways. The trackways direct the books to positioning mechanism whereby the books are placed on edge and oppositely-disposed preparatory to their being assembled in a column laterally adjacent each other, with their thick and thin ends in alternation, as will presently appear. Such positioning mechanism, in the form herein illustrated, includes two intermittently rotatable pocketed turrets 78, 79, as they may be termed, which have a common axis of rotation, said turrets being spaced a suitable distance apart on a shaft 80 having its bearings in brackets rising from the table. These turrets are adapted to receive the books ejected from the short and long trackways respectively by the action of the reciprocating feed-dogs 75, and hence the rearward turret 79 (which may be termed the large turret) is of greater diameter than the forward one 78 (which may be termed the small turret) in order that the pockets of the turrets shall be brought into alinement with the respective trackways. Moreover, the pockets of the large turret, being laterally offset in respect to those of the small turret, as will presently appear, successively occupy a lower horizontal plane than the pockets of the small turret when the pockets of the two turrets are positioned to receive the books from the respective trackways. Hence the delivery end of the long trackway is inclined as above-described.

In the present instance, each of the pocketed turrets is provided with four equally spaced pockets, and provision is had whereby the shaft 80 is intermittently actuated to advance the pockets concurrently to their respective trackways 73, 74. Accordingly the shaft 80 is provided at one end with a gear wheel 81 in mesh with a gear wheel 82 on an adjacent shaft 83. The latter shaft is equipped with the slotted driven member 84 of a Geneva stop, the pin drive member 85 of which is mounted on a stud-bolt 86 on a bracket rising from the main frame, and is provided with a sprocket wheel 87 which is connected by means of a chain 88 with a similar wheel 89 on a suitably-disposed shaft 90. This shaft is equipped with a bevel gear wheel 91 which meshes with a wheel 92 on the main shaft; and hence the motion is transmitted to the Geneva stop in a manner to rotate the turret shaft 80 intermittently and temporarily lock it at the end of each impulse. (See Figs. 1, 30, 31 and 35).

The turret 78 comprises a head 93 fast on the shaft 80, having four equally-spaced radially-extending stud-shafts 94 mounted to rotate in bearings in the head. These arms bear at their outer ends channel members 95 which, in conjunction with spring-clips 96 thereon, constitute pockets to receive and clamp the match books successively ejected from the short-trackway by the leading feed-dog 75. On the inner end of each of the shafts 94 is a bevel gear 97 which, during a part of the rotation of the head, meshes with a segmental gear rack 98, secured to an extending hub of the adjacent bearing for the shaft 80, said gear, its stud-shaft and pocket during the co-action of the gear with the racks, thus being partially rotated independently of the head. (See Figs. 1, 2, 3 and 7 to 12, inclusive; also Figs. 54 and 55).

During each rotation of the turret 78 the spring pockets thereof are actuated by the co-acting gear and rack devices to bring the pockets successively into horizontal position to receive the books from the short trackway, and independently to turn the said pockets about their radial axes in such manner that when the pockets occupy a vertical position, directly beneath the axis of the turret, the position of the contained books is reversed, i. e., they are held in a vertical position with their narrow ends extending rearward. The sequence of the operations of each pocket and its gear devices during a complete rotation of the turret is briefly as follows: Assume the pockets to occupy the relative positions indicated in Fig. 8, wherein the horizontal pocket to the left is in position to receive a book, and the lower vertical pocket is in position for the ejection of its book. In the initial quarter-turn of the turret 78 to the right (that is, clockwise) the gear 97 of such horizontal pocket is moved through the space between the ends of the segmental racks, such gear being at that interval locked against independent rotation, by the engagement of a spring-pawl 99 with a suitably-disposed notch 100 in the hub of the gear. It may be noted, in passing, that there are two notches in each gear hub, diametrically opposite to each other, and that the pawl is secured to one side of the head so as to register with one or the other of the notches during each semi-rotation of the gear. (See Fig. 10). In this initial movement the locked gear 97 of the pocket under consideration is brought to a position with one of its teeth in contact with the first tooth of the opposing rack 98, (as indicated by the left hand gear in Fig. 9.) In the second turn of the turret, the co-acting gear and rack independently rotate the pocket one-half turn (as indicated by the right hand gear in Fig. 9) and the gear is locked by the spring pawl 99. In the third movement of the turret the gear moves through the succeeding blank space and contacts at the end of its movement with the teeth of the opposing rack. In this movement the pocket is locked against independent rotation, and is brought to a vertical position, directly beneath the axis of the turret, the contained book thus being disposed on its edge and its narrow end being directed inward. In the fourth movement of the turret, the co-acting gear and rack independently rotate the said pocket and bring it to its original position to receive a book from the short track-way. The turret 79 comprises four arms extending from a hub 101 on the shaft 80 and bearing at their free ends pockets constituted by channel members 95′ and spring clips 96′. These pockets are similar in construction to those of the first described turret, save that they are fixedly secured to the arms and always face in the direction of rotation of the turret. (See Fig. 13).

As above described the pockets of the turret 79 extend outwardly beyond the adjacent pockets of the turret 78, so as to pass successively to position to receive the books ejected from the long trackway. The books are ejected from the pockets pockets of the large turret when the said pockets are in their upper vertical position, and the books are ejected from the pockets of the small turret when the latter pockets are in the lower vertical position, for a purpose hereinafter explained. The ejecting means for coöperation with the pockets of the small turret comprises a slide 102 fitted to guide-ways in a bracket 103 on the table, and the ejecting means for coöperation with the pockets of the large turret comprises a slide 104 fitted to guide-ways in a standard 105 on the table. (See Figs. 3, 7 and 11 to 14, inclusive). The functional ends of these slides are bifurcated so as to embrace the clips of the respective pockets and act directly upon the opposing match-books. The slides are concurrently actuated in a manner to push the books simultaneously from their respective turrets. In the present instance the slide 102 is pivotally connected with the upper end of a rock-arm 106 which is fulcrumed to a bracket on the base of the frame 70, and the slide 104 is connected with the upper arm of a lever 107 which is fulcrumed on the side of the standard 105. The lower arm of this lever and the rock-arm are pivotally connected by means of links 108, 109 respectively, with the upper end of a rock-arm 110 which is fulcrumed to a bracket on the base of the main frame. The rock-arm 110 is provided with a laterally disposed stud or roller 111 which enters the groove of a face-cam 112 on the main shaft 69, whereby the said arm is periodically oscillated in a manner to effect the timely reciprocation of the two slides.

When the books are ejected from the turrets they are assembled and supported in an orderly manner with their thick and thin ends in alternation as above mentioned, and while any appropriate means for receiving and supporting the assemblage of books may be employed I prefer to use for this purpose an endless carrier which extends in a path between the two turrets. This carrier in the form herein illustrated comprises an endless chain of pivotally connected links 113 (Figs. 51, 52 and 53) each of which is provided with a series of outwardly-extending blades or jaws 114 between which the books are inserted and held. The adjacent blades are preferably set at an angle to each other to provide spaces corresponding with the tapering form of the books, and said books, in virtue of their springy nature, are frictionally held between the opposing walls. The inner sides of the links are provided with rack-teeth 115 with which co-act impelling and guiding gear wheels for the carrier; and the latter is so mounted and arranged that the pockets in the upper run thereof pass adjacent the delivery path of the pockets of the large turret and the pockets of the lower run pass adjacent the delivery path of the pockets of the small turret. (See Fig. 8).

The upper run of the carrier is supported by means of a bar 116 which extends almost the entire length of the machine and is supported by brackets 117, and the lower run of the carrier is guided by two short bars 118 which extend parallel with the upper bar and are supported by the brackets 117. (See Fig. 2). On the sides of the bars 116, 118 are channel members 119 which embrace edge ribs on the links of the carrier and support and guide the carrier during its travel. The ends of the carrier pass about gear wheels 120, 121 which are carried by shafts 122, 123 respectively, and the body of the carrier passes about two spaced gear wheels 124, 125 on transverse shafts 126, 127 respectively. The wheel 124 meshes with the gear teeth on the upper and lower runs of the carrier, and the wheel 125 meshes with the gear teeth on the lower run only of the carrier. The shaft 126 of the wheel 124 has secured thereto, at one end, a gear wheel 128 which meshes with a gear wheel 129 turning on a stud 130 projecting from a bracket 131 on the table. Secured to the gear wheel 129 is a sprocket wheel 132 which is connected to a similar wheel 133 on a shaft 134 by means of a sprocket chain 135. The shaft 134 is provided with a gear wheel 136 in mesh with a similar wheel 137 on the driven shaft 90 above referred to. Thus the motion is transmitted from the shaft 90 to the gear wheel 124 which, perforce, continuously moves the proximate portions of the carrier in the direction indicated by the arrows in Fig. 2.

The gear wheel 125 is intermittently actuated in order to impart a corresponding motion to the adjacent portion of the carrier for a purpose hereinafter explained. Accordingly the shaft 127 of the wheel 125 has secured to one end a gear wheel 138 which meshes with a gear wheel 139 on a stud shaft 140 on a suitably-disposed bracket rising from the table. (See Figs. 1, 30 and 32.) Affixed to the wheel 139 is a stop gear 141 which meshes with a companion gear 142 on an adjacent stud shaft 143; the latter shaft carrying a sprocket wheel 144 which is connected by means of a chain 145 to a similar wheel 146 on the shaft 90 above mentioned. (See Figs. 30 and 32.) Thus the intermittent motion is transmitted from the shaft 140 to the carrier-actuating gear 125. In the form of stop gearing herein shown, the gear 141 has a certain number of teeth omitted to form an extended concave portion 147 and the gear 142 has a certain number of teeth omitted and shaped to form a corresponding convex portion 148; so that when such portions are in register, as seen in Fig. 32, the gear 141 is temporarily locked in place. The diameter of the gear 142 (and number of teeth) is such that during the time it is active, it moves the carrier at such a speed as to compensate for the interval of rest, i. e., it moves an equal quantity of the carrier in a given time, including the stoppage. On account of the variable motion of the book-carrier as it passes from the intermittently-rotating gear wheel 125 to the continuously-rotating gear wheel 124, provision is had for an intervening slackness of the chain. This slack portion is guided upon a curved supporting bar 149 which is interposed between the guide bars 118, and in order to take away any undue strain on the carrier during its change of motion, idlers 150 therefor are provided at the respective ends of the curved bar. (See Figs. 2 and 48.) The shaft 122 for the carrier supporting wheel 120 at the left hand end of the machine (as viewed in Fig. 2) is carried by the up-projecting arm of a bell-crank lever 151 fulcrumed in a bearing on the top of the table. A spring 152 interposed between the table and the other arm of the lever tends to maintain the wheel 120 yieldingly outward and thus keep the carrier under tension. The teeth of the wheel 120 are so spaced that one engages each link 113 of the carrier in the central interdental space of the link, thus serving as a "locator" for the carrier.

The shaft 123 for the carrier-supporting wheel 121 at the right hand end of the machine (as viewed in Fig. 2) is journaled in bearing brackets 153 secured to the top of a slide 154 which is fitted to ways in the top of the table and is guided by caps 155. (Fig. 47.) The slide is held yieldingly retracted by means of a spring 156 secured thereto and to the table, and thus the slide acts as a take-up or "compensator" to keep the carrier under tension during the time a portion of the carrier is at rest. The slide is provided with curved guard members 157 which are arranged to embrace the adjacent flexure of the carrier and thus obviate liability of displacement of the books in the latter. The teeth of the wheel 121 correspond with those of the wheel 120 and similarly act upon the central interdental spaces of the chain links.

In Fig. 14 the relation of the delivery pockets of the transfer wheels to each other and to the carrier is shown. In this view the carrier is indicated as moving continuously to the right, and the spring pockets of the large wheel 79 is in position for the discharge of the book a by the slide 104, which is done very quickly. It will be noted that the pocket-spring 96' is on the side facing the direction of movement of the carrier so that the spring can yield slightly as the book enters the carrier. Further, that the thin end of the tapering book enters the wide end of the opposing space on the carrier. The books are simultaneously inserted from the respective sides of the carrier, and, in virtue of the tapering form of the books, their large and small ends are disposed in alternate relation in the successive book holders of the carrier, as illustrated. Since the carrier, in the form herein shown, comprises links having four spacing sections, whereof adjacent sections are oppositely tapered, and as the upper and lower portions of the carrier are advanced continuously and uniformly to the path of the books, as they are ejected from the respective transfer wheels, it follows that as two books are simultaneously inserted at the respective sides of the carrier, one or the other must be offset or out of line. Hence in the present construction the spring pocket of the smaller wheel 78 is on a line with the center of shaft 80 while the center line of the spring pocket of the larger wheel is laterally offset, as hereinbefore mentioned. (See Figs. 8 and 14). In Fig. 14 the slide 102 is indicated as having pushed alternate books into the carrier, the alternate blank spaces for the reception of the books in the succeeding actions of the slide 104 being shown. In this view also appear the books which have been inserted into the alternate spaces of the carrier by the slide 104. When the carrier passes beyond the delivery pocket of the large turret wheel the successive spaces of the carrier have been supplied with match books arranged in alternation as regards their thick and thin ends. The books as thus borne by the carrier from such large turret to the right hand end of the machine, can be readily inspected, and imperfect books, if any, removed and replaced. The books are carried around the guard members 157 at the right hand end of the machine, and into the path of a book-ejector (Figs. 1, 2, 15, 17, 24, 25, 45 and 46) by means of which a predetermined number of books is ejected from the carrier during each dwell of the latter in its intermittent travel. The book ejector comprises, in the present instance, two vertically-disposed parallel plates 158 connected by distance pieces 159, the lower portions of said plates embracing the lower stretch of the book carrier and its supporting parts and being adapted by vertical movement to impinge against the opposing books and eject them from the carrier. In the form illustrated the plates are proportioned to engage and discharge twenty-five books from the carrier during each dwell of the carrier. (See Fig. 46). The distance pieces are slidingly fitted to and guided by vertical posts 160 rising from the adjacent bar 118. The upper piece is flexibly connected at its ends, by means of links 161 to a pair of rock-arms 162 which extend from a shaft 163 having its bearings in brackets rising from the table. On this shaft is fixed an arm 164 which is connected by means of a link 165 with a rock-arm 166 which is pivoted to a bracket 167 on the underside of the table 71. The arm 166 is provided with a stud or roller 168 which enters the groove of a face-cam 169 on a driven shaft 170 and is thereby actuated to effect the timely reciprocation of the book-ejector. (See Fig. 15). The shaft 170 is provided with a spur wheel 171 in mesh with a pinion 172 on an adjacent shaft 173, and the latter shaft is provided with a spur wheel 174 in mesh with a pinion 175 on the main shaft 69. Thus the motion is transmitted from the main shaft to the shaft 170. (See Figs. 3 and 35.)

Mechanism for supplying the narrow partition strips and interposing them between adjacent rows of books removed from the carrier as above described will now be considered. The source of strip supply in the form illustrated includes a hopper 176 (Figs. 1, 13, 15, 38 and 39) which is supported upon the top of a slide-way frame 177 on the table adjacent the book ejector. This hopper is adapted to contain superposed relatively narrow partition strips (b) of paste-board (or other suitable material), each corresponding in width with a match book and being equal in length to the width of the box into which the books are to be introduced. The lowermost strip rests upon the bottom plate 178 of the hopper, in position for engagement by shoulders on the upper side of a reciprocating slide 179 which is mounted in guides in the frame 177. The shoulders are provided by ribs 180 which project through slots in the bottom plate 178 and are positioned to eject the partition strips one by one through the throat 181 of the hopper. The slide 179 is connected to two arms 182 rising from a rock-shaft 183 and extending through suitable openings in the table 71. On this shaft is an arm 184 bearing a stud or roller 185 which runs in the groove of a face-cam 186 on a driven shaft 187 and thereby effects the timely reciprocation of the slide. This shaft 187 is equipped with a sprocket wheel 188 which is connected by means of a chain 189 with a similar wheel 190 on the driven shaft 170. (See Fig. 35). Adjacent the discharging opening of the hopper 176 is a downwardly-curved guide-way comprising channel members 191, into which the strips b are successively delivered by the slide 179. Each strip when it enters and passes down the guide-way is turned thereby from a horizontal to a vertical position, coming to rest below and laterally of the vertical path of the book-ejector above-described, and being maintained in a vertical position adjacent a row of books depressed from the carrier by said ejector. In order to insure the disposition of the strip laterally of the row of books thus ejected the forward plate 158 of the ejector may be provided at its lower end with an angle-piece, as 194, which is adapted to impinge against the upper edge of the opposing division strip during the downward book-ejecting stroke of the ejector. Any other appropriate means may be employed to dispose the strip vertically adjacent the row of books, but the curved guide-way just described affords a simple and efficient device for the purpose.

The books when they are ejected from the carrier are preferably supported upon a suitable bed 195 (Figs. 2, 15, 24, 25 and 26) between two end positioning plungers 196, which are adapted to compress the books into a space corresponding with the width of the box into which the books are to be introduced. The plungers are fitted to guide-ways in the table 71 each guide-way being conveniently provided by and between a bracket 208' below referred to and a laterally extending portion 193 at the foot of the channel member 191. (See Fig. 26). The plungers are jointed by depending lugs 197 with the upper ends of vertical rock-arms 198 which are pivoted to brackets 199 on the main frame. These arms are provided with studs or rollers which run in the grooves of corresponding cams 200 on the driven shaft 170, and thereby the arms 198 are actuated in a manner to effect the timely reciprocations of the plungers.

The bed upon which the books are delivered from the carrier is shaped to afford a support for the positioning plungers, and it is also provided forwardly of the path of the plungers with a throat or opening which is closed by a yielding barrier comprising in the present instance two swinging plates 201 which are hinged to the body of the bed. The pivot rods for the plates 201 are provided at one end with sectors 201ª which, meshing together, effect simultaneous uniform movement of the plates when one or the other is swung on its pivot. These plates are held normally in a horizontal position by means of a spring 201ᵇ which is secured to one of the sectors and to a post 201ᶜ on the table. (Figs. 26, 27 and 28).

The compact series of books and the contiguous strip are pushed beyond the plane of the plungers 196, preferably by a plunger, as 202, which moves at right angles to the latter, the lower portion of the guide-members within which the positioned strip is supported, being cut-away, (as at x, Figs. 36 and 36ª) to permit the movement therethrough of the plunger 202. This plunger 202 is fitted to a guide-way in the table, and is connected by means of a link 203 with a rock-arm 204 which is pivoted to a bracket 205 on the main frame. This arm bears a stud or roller 206 which runs in the groove 207 of the double-face cam 186, and thus the arm is actuated in a manner to effect the timely reciprocation of the plunger 202. In the first-forward movement of the plunger 202 the opposing strip and books are advanced until the ends of the strip enter the grooves 208 of suitably disposed brackets 208' on the bed 195. The plunger 202 recedes, and the book ejector thereupon acts to discharge a succeeding series of books from the carrier (but without a partition strip), which series is disposed between and compressed by the end plungers 196. This done, the plunger 202 again moves forward and forces the two rows of books, with the interposed strip, upon the hinged plates 201. The coördination of the parts is such that in each ejecting stroke of the strip-feeding plate 179 there are two discharging operations of the book ejector, thus effecting the disposition of only one strip between two rows of books. Also the contour of the cam groove 207 is such that the arm is reciprocated twice during each rotation of the cam, and to two different positions, in order to effect the proper disposition of the rows of match books as above described. When the two rows of books, with the partition strip (b) between them, are finally advanced by the plunger 202, a relatively wide strip (c) of pasteboard (or other suitable material) is imposed upon them, which strip corresponds substantially in length and width with the interior of the box. The source of wide-strip supply, in the present instance, comprises a suitable hopper 209 which is supported upon the table adjacent the hinged supporting sections of the bed. This hopper is adapted to contain a pile of the wide strips, the lowermost one whereof rests upon a reciprocating feed-plate 210 at the bottom of the hopper. This plate is shouldered on its upper surface, as by the ribs 211, in order to eject the strips one by one from the throat 212 of the hopper 209, and it is carried by a slide 213 which is fitted to guides in the table. The slide is connected by means of a link 214 with a vertical rock-arm 215 which is pivoted to a bracket 216 on the main frame and bears a stud or roller 217 which runs in the groove 218 on a double face cam 219 on a driven shaft 220 and is thereby actuated in a manner to reciprocate the slide. (See Fig. 16). The shaft 220 has its bearings in brackets 221 on the main frame and carries a sprocket wheel 223 which is connected with and driven by a similar wheel 224 on the shaft 187 by means of a chain 223ᵃ (Fig. 35). As each strip (c) is ejected from the hopper 209 the lateral edges of the strip pass upon and are supported preferably by recesses or ledges 225 in spaced bars 226 at the respective sides of the throat or opening of the bed 195 so as to lie directly above the space occupied by the two rows of books and their intervening strip (b). Clip springs 227 secured to the bars overhang the lateral recesses or ledges of the latter in a manner to bear upon and maintain in place the opposing edges of the strip. (See Fig. 41). The wide strip thus ejected and supported is forced down upon the underlying partitioned rows of books. An effective means for this purpose comprises a vertically reciprocating plunger 228 which is slidingly fitted to guide-ways in the adjacent wall of the hopper 209. This plunger is pivotally connected by means of links 229 with rock arms 230 sleeved on a shaft 231 fixed to a bracket on the main frame. An arm 232 rising from the sleeve bears a stud or roller 233 which runs in a groove 234 of the face-cam 219 and is thereby actuated in a manner to oscillate the arms 230 and effect the timely reciprocation of the plunger 228. When the plunger 228 descends it pushes the strip (c) upon the underlying partitioned rows of books, and forces the whole downward against the yielding action of the plates 201, into an underlying box B, until the bottom of the plunger is a slight distance below the free ends of the swinging plates; the latter, as will be noted, entering the box and acting similarly to a funnel to guide the books into the box. (See Fig. 18). Upon the ascent of the plunger 228 these plates resume their normal position, and thereupon two additional rows of books, with a narrow partition strip between them, are pushed into position upon the swinging plates by the plunger 202; and the plunger 228 is caused to descend a distance sufficient to enter the books into the box and depress the filled box. (See Fig. 19). In this action the plunger acts directly upon the opposing books.

The box to be filled is supported by and between a pair of swinging jaw plates 235 which are pivoted by shafts 236 to brackets 237 depending from the bed 195. (Figs. 15, 18, 19, 20, 21 and 29). In the present instance these plates are held normally in clamping position by suitably - disposed springs 238, and the shafts 236 are provided at one end with meshing sector bearing arms 239 to insure simultaneous lateral movement of said plates. (See Fig. 29). When the box has been filled it is pushed down below the jaw plates 235 and between two pairs of vertically-disposed friction plates 240, 241, as indicated in Fig. 23. The pair of plates 240 are secured to cross-bars 242 which are affixed to a depending bracket 243 on the table, and the other plates 241 are secured to outwardly-extending rods 244 which are slidingly fitted to a depending bracket 245 on the table. The plates 241 are maintained yieldingly inward by the action thereagainst of suitably-disposed springs 246 seated in sockets in the bracket 245. The filled box is held by and between the plates 240, 241 until it is pushed down by the next descending box. The box upon being freed from the plates 240, 241 is delivered to a suitable take-off, such, for example, as the belt conveyer 247. This conveyer 247 passes about suitably-disposed rollers 248, the shaft 249 of one of which bears a sprocket wheel 250 which is connected with and driven from a sprocket wheel 251 on the shaft 126 by means of a chain 252. (See Figs. 15, 20 and 30).

The empty boxes are delivered to and between the supporting plates 235 as rapidly as the filled boxes are discharged. In the present instance the empty-box feed mechanism comprises a belt conveyer 253 (Fig. 20) which is supported by suitably-disposed rollers 254, the shaft 255 of one of which bears a sprocket wheel 256 which is operatively connected by means of a chain 257 with a sprocket wheel 258 which is affixed to the sprocket wheel 132 hereinbefore referred to. (See Fig. 30). The empty boxes are conveniently placed side by side on the conveyer 253 which is constantly moving, and thus the leading box is in position for immediate entry into the space between the swinging jaw plates 235 when the filled box has been depressed by the action of the plunger 228. The conveyer 253 quickly advances the empty box between the jaws before the next descending stroke of the plunger 228 occurs. Suitably-disposed stops, as 259, for the corners of the infed box are preferably provided by angular recessed portions of the bracket 245 (see Figs. 20 and 21); and since the conveyer belt 253 is constantly moving underneath the empty boxes during the time that a box is being filled, guide-plates 260 to keep the boxes in alinement are advantageously arranged laterally of the conveyer. Also preferably, a bracket 261 is secured to the angular depressing foot of the plunger 228 so as to prevent the delivery of an empty box between the plates 235 until the said plunger has moved upward out of the horizontal path of the leading box on the feed-conveyer. (See Fig. 23).

I wish it to be understood that the term "books" as used in the appended claims is inclusive of unitary groups of matches, with or without covers; and acordingly.

I claim as my invention—

1. In a machine for packing flat match books and the like, the combination with means for feeding the books with the heads of their respective groups of matches pointed in the same direction, of positioning means for receiving the said books and reversing the endwise position of alternate books as to the match heads.

2. In a machine for packing match-books and the like, the combination with means for feeding books, of means for reversing the endwise position of alternate books, a book-supporting element, and means for assembling the books side by side thereon with the match heads of adjacent books oppositely-disposed.

3. In a machine for packing flat match books and the like, the combination with means for feeding the books, of positioning means for reversing the endwise position of alternate books as to the match heads, a traveling carrier, and means for assembling on said carrier the books thus positioned.

4. In a machine for packing flat match books and the like, the combination with means for feeding the books in pairs with the heads of their respective groups of matches pointed in the same direction, of positioning means for reversing the books of each pair as to their match heads, a traveling carrier, and means for assembling on said carrier the books thus positioned.

5. In a machine for packing match-books and the like, a carrier, means for depositing match-books side by side thereon at one part of the travel of the carrier, with the match heads of adjacent books oppositely disposed, and means for ejecting rows of books from the carrier at another part of its travel.

6. In a machine for packing match-books and the like, the combination of means whereby flat-lying books are fed in pairs, means whereby said books are oppositely-disposed as to the match heads, means whereby said books are shifted toward each other, and means for receiving the books thus shifted and supporting them laterally adjacent each other.

7. In a machine for packing match-books and the like, the combination of means whereby books are fed in pairs, book-positioning means including rotary devices to receive said book and reverse their position endwise relatively to each other, means whereby the books are shifted from said devices, and means for receiving the books thus shifted and supporting them laterally adjacent each other.

8. In a machine for packing match-books and the like, the combination of means whereby books are fed in pairs, means whereby said books are oppositely disposed as to the match heads, a carrier adjacent said books, and means whereby said books are transferred to the carrier and thereby held laterally adjacent each other.

9. In a machine for packing match-books and the like, the combination of means whereby books are fed in pairs, book-positioning means including rotary devices to receive said books and reverse the endwise position of adjacent books relatively to each other, a carrier, and means whereby the books are transferred to the carrier from said devices and thereby held laterally adjacent to each other.

10. In a machine for packing match-books and the like, the combination with a source of book supply, of a trackway upon which the books are successively delivered, book-positioning means adjacent said trackway, means for feeding the books along said trackway and to the positioning means, means for ejecting the books from said positioning means, and means to receive and support the books in successive order.

11. In a machine for packing match-books and the like, the combination with a source of book supply, of a trackway upon which the books are successively delivered, book-positioning means adjacent said trackway, means for feeding the books along said trackway and to the positioning means, means for ejecting the books from said positioning means with the successive books oppositely-disposed relatively to their ends, and means to receive the successive books thus ejected and support them side by side.

12. In a machine for packing match books and the like, the combination with a source of book supply, of a trackway upon which the books are successively delivered, book positioning means adjacent said trackway, means for feeding the books along said trackway and to the positioning means, a carrier, and means whereby the books are transferred from said positioning means to the carrier.

13. In a machine for packing match-books and the like, the combination with a source of book supply, of a trackway upon which the books are successively delivered in pairs, a pair of positioning means to receive the respective books, means for feeding the books along said trackway and to the positioning means, a carrier, and means whereby the books are transferred from the respective positioning means to the carrier.

14. In a machine for packing match-books and the like, the combination of a carrier having means to receive match books and hold them in lateral relation to each other, and means whereby successive rows of the laterally assembled books are removed from said carrier.

15. In a machine for packing match-books and the like, the combination with a book-supporting element, of means for assembling the books side by side thereon, with the match heads of adjacent books oppositely-disposed, and means whereby rows of books are removed from the assemblage.

16. In a machine for packing match-books and the like, the combination with a book-supporting element, of means for assembling the books side by side thereon, means whereby rows of books are removed from the assemblage, a box-support, and means whereby one or more rows of books thus removed are introduced to a box on said support.

17. In a machine for packing match-books and the like, the combination with a book-supporting element, of means for assembling the books side by side thereon, means whereby succeeding rows of books are removed from the assemblage, a support upon which the rows of books thus removed are deposited, and means whereby each row of books is advanced along said support preparatory to the removal from the book-supporting element of a succeeding row of books.

18. In a machine for packing book-matches and the like, the combination of a support, means for depositing successive rows of match books thereon, and means for compressing the said rows.

19. In a machine for packing match-books and the like, the combination with a carrier having laterally-adjacent book holders, of means for assembling books in said holders, means for ejecting a predetermined number of books from said carrier, and means for compressing the row of books ejected from the carrier.

20. In a machine for packing match-books and the like, the combination of means whereby the books are arranged in adjacent rows, and means whereby partition strips are interposed between said rows.

21. In a machine for packing match-books and the like, the combination of a book-carrier, a support, means for transferring successive rows of books from the carrier to the support, and means for inserting narrow partition strips between said rows at predetermined intervals.

22. In a machine for packing match-books and the like, the combination of means whereby the books are arranged in adjacent rows, means whereby the rows are compressed, and means whereby partition strips are interposed between said rows.

23. In a machine for packing match-books and the like, the combination of a carrier having means to receive match-books and hold them in lateral relation to each other, means adjacent the path of the carrier for ejecting successive rows of books therefrom, a support upon which the discharged rows of books are successively deposited, means whereby each row of books is advanced along said support preparatory to the discharge from the carrier of the next succeeding row of books, and means whereby a narrow partition strip is interposed between adjacent rows.

24. In a machine for packing match-books and the like, the combination of a carrier having means to receive match-books, and hold them in lateral relation to each other, means adjacent the path of travel of the carrier for ejecting successive rows of books therefrom, a support upon which the discharged rows of match-books are successively deposited, means whereby each row of books is longitudinally compressed, means whereby the same is advanced along said support preparatory to the discharge from the carrier of the next succeeding row of books, and means whereby a narrow partition strip is interposed between adjacent rows.

25. In a machine for packing matchbooks and the like, the combination of a carrier, means for continuously impelling the same at one part of its travel, means for intermittently impelling the carrier at another part of its travel, means adjacent the path of continuous travel of said carrier for assembling match books side by side on said carrier, means adjacent the intermittent path of travel of said carrier for discharging books in rows from the carrier, a support for the books thus ejected from the carrier, and means whereby partition strips are interposed between adjacent rows.

26. In a machine for packing matchbooks and the like, the combination of means for sustaining an assemblage of books, means whereby books in rows are removed from said assemblage, a support for the rows of books thus removed, a hopper for narrow partition strips, means whereby the strips are successively ejected from the hopper, means whereby a strip is interposed between adjacent rows of books on the support, and means whereby the partitioned rows are advanced along the support.

27. In a machine for packing matchbooks and the like, the combination of means for sustaining an assemblage of books, a plunger whereby books in rows are removed from said assemblage, a support for the rows of books thus removed, a hopper for narrow partition strips, means whereby the strips are successively ejected from the hopper, means whereby a strip is guided to a vertical position between succeeding rows of books and beneath the plunger, and means whereby said rows of books with the partition strip between them are advanced along the support.

28. In a machine for packing matchbooks and the like, the combination of means for sustaining an assemblage of books, a plunger whereby books in rows are removed from said assemblage, a support for the rows of books thus removed, means for compressing each row, a hopper for narrow partition strips, means whereby the strips are successively ejected from the hopper, means whereby a strip is interposed between adjacent rows of books on the support, and means whereby the partitioned rows are advanced along the support.

29. In a machine for packing match books and the like, the combination of a book-carrier, means whereby match books are assembled thereon side by side, means whereby books in rows are discharged from said carrier, a support for the rows of books, said support having a discharge throat, means whereby partition strips are interposed between adjacent rows of books, means whereby the partitioned rows of books are advanced along said support to its discharge throat, and means whereby the said partitioned rows are discharged through said throat.

30. In a machine for packing matchbooks and the like, the combination of means whereby the books are arranged in superposed layers, whereof each layer comprises a plurality of adjacent rows of books, and means whereby a partition strip is interposed between the layers.

31. In a machine for packing matchbooks and the like, the combination of means whereby the books are arranged in superposed layers, whereof each layer comprises a plurality of adjacent rows of books, means whereby a partition strip is interposed between the rows of each layer, and means whereby a partition strip is interposed between the layers.

32. In a machine for packing match books and the like, the combination of means for sustaining an assemblage of books, a plunger whereby books in rows are removed from said assemblage, a support for the rows of books thus removed, means whereby the said rows are advanced along the support, a hopper for wide partition strips, means whereby the strips are successively ejected from the hopper and sustained above the path of the rows of books on the support, and means whereby the said strips are individually imposed upon the subjacent rows of books.

33. In a machine for packing match-books and the like, the combination of means for sustaining an assemblage of books, a plunger whereby books in rows are removed from said assemblage, a support for the rows of books thus removed, said support having a throat portion, a yielding barrier for said throat portion, means whereby the said rows are advanced along the support and upon the said barrier, a hopper for wide partition strips, means whereby the strips are successively ejected from the hopper and sustained above the rows of books supported on said barrier, and means whereby the said strips are individually pressed down upon the subjacent rows in a manner to overcome the resistance of the said barrier.

34. In a machine for packing match-books and the like, the combination with means whereby the books are arranged in adjacent rows, means whereby partition strips are interposed between said rows, a box-support, and means whereby said partitioned rows are entered into a box on said support.

35. In a machine for packing match-books and the like, the combination of a book-carrier, means whereby match books are assembled thereon side by side, means whereby books in rows are discharged from said carrier, a support for the rows of books, said support having a discharge portion, means whereby a partition strip is interposed between adjacent rows of books, means whereby the partitioned rows of books are advanced along said support to its discharge portion, means whereby the said partitioned rows are discharged through said portion, and means whereby a box is supported in position beneath said discharge portion to receive the said partitioned rows.

36. In a machine for packing matchbooks and the like, the combination with means for arranging the books in superposed layers, whereof each layer comprises a plurality of adjacent rows of books, means for inserting a partition strip between the rows of each layer, means for inserting a wide partition strip between the layers, a box support, and means for inserting the partitioned rows and layers into a box on said support.

37. In a machine for packing match-books and the like, the combination of means for sustaining an assemblage of books, means whereby books are removed from said assemblage and arranged in superposed layers, each layer comprising plural rows of books, a source of supply of narrow strips, means whereby said strips are interposed between adjacent rows of each layer, a source of supply of wide strips, means whereby a wide strip is interposed between the layers, a source of box supply, and means whereby the partitioned rows and layers are introduced to a box.

38. In a machine for packing match-books and the like, the combination of means for sustaining an assemblage of books, a plunger whereby books in rows are removed from said assemblage, a support for the rows of books thus removed, said support having a throat portion, a yielding barrier for said throat portion, a hopper for narrow partition strips, means whereby the strips are successively ejected from the hopper, means whereby a strip is interposed between adjacent rows of books on the support, means whereby the partitioned rows are advanced along the support and upon said barrier, a hopper for wide partition strips, means whereby the strips are successively ejected from the latter hopper and sustained above the partitioned rows of books supported on said barrier, means whereby the wide partition strip is pressed down upon the subjacent rows in a manner to overcome the resistance of the barrier, and means whereby a box is supported in position beneath said throat to receive the said partitioned rows.

39. In a machine for packing match-books and the like, a support having a throat portion, a yielding barrier for said throat portion adapted to sustain rows of books, means for depressing said books to overcome the resistance of said barrier, yielding jaw-plates below said throat portion, means for supplying an empty box between the jaw plates and in position to receive the depressed books, and means below the jaw plates adapted to receive and carry off the box and its contents.

40. In a machine for packing match-books and the like, a support having a throat portion, a yielding barrier for said throat portion adapted to sustain rows of books, means for depressing said books to overcome the resistance of the barrier, yielding jaw plates below said throat portion, means for supplying an empty box between said jaw plates and in position to receive the depressed books, friction means below said plates adapted to embrace the box in its descent, and means below the friction means adapted to receive and carry off the box and its contents.

Signed at Barberton in the county of Summit and State of Ohio this 19th day of April A. D. 1913.

JOSEPH C. DONNELLY.

Witnesses:
  F. A. JOHNSTON,
  SABINA PARKS.